United States Patent [19]
Chapman

[11] Patent Number: 6,082,670
[45] Date of Patent: Jul. 4, 2000

[54] METHOD AND ARRANGEMENT FOR FLUIDBORNE VEHICLE PROPULSION AND DRAG REDUCTION

[75] Inventor: John H. Chapman, Groton, Conn.

[73] Assignee: Electric Boat Corporation, Groton, Conn.

[21] Appl. No.: 08/883,031

[22] Filed: Jun. 26, 1997

[51] Int. Cl.[7] ................................ B64D 27/16
[52] U.S. Cl. ............................... 244/55; 244/56
[58] Field of Search .................. 244/53 B, 55, 244/30, 110 B, 52, 209, 190; 440/38; 114/20.1, 21.1, 21.2

[56] References Cited

U.S. PATENT DOCUMENTS

| | | | |
|---|---|---|---|
| 1,315,352 | 9/1919 | Torazzi . | |
| 2,024,274 | 12/1935 | Campini | 244/18 |
| 2,305,485 | 12/1942 | Merriam | 114/21.2 |
| 2,351,750 | 6/1944 | Fawkes | 114/20 |
| 2,477,637 | 8/1949 | Mercier | 244/15 |
| 2,509,890 | 5/1950 | Stalker | 244/15 |
| 2,694,357 | 11/1954 | Lee | 98/1 |
| 2,938,481 | 5/1960 | Maxwell et al. | 114/20 |
| 2,969,759 | 1/1961 | Giles | 114/20 |
| 3,134,353 | 5/1964 | Pedersen et al. | 114/20 |
| 3,194,201 | 7/1965 | Lang | 114/20 |
| 3,410,510 | 11/1968 | Pabst | 244/130 |
| 3,575,127 | 4/1971 | Wislicenus et al. | 115/12 |
| 3,997,134 | 12/1976 | Drakeley | 224/110 B |
| 4,402,475 | 9/1983 | Pavlecka | 244/52 |
| 4,456,203 | 6/1984 | Louthan | 244/52 |
| 4,463,772 | 8/1984 | Ball | 137/15.2 |
| 4,648,322 | 3/1987 | Heitz et al. | 102/411 |
| 4,831,297 | 5/1989 | Taylor et al. | 310/87 |
| 4,901,947 | 2/1990 | Raymer | 244/53 B |
| 5,101,128 | 3/1992 | Veronesi et al. | 310/54 |
| 5,108,323 | 4/1992 | Veronesi et al. | 440/53 |
| 5,185,545 | 2/1993 | Veronesi et al. | 310/114 |
| 5,205,653 | 4/1993 | Veronesi et al. | 384/306 |
| 5,220,231 | 6/1993 | Veronesi et al. | 310/90 |
| 5,252,875 | 10/1993 | Veronesi et al. | 310/114 |
| 5,257,952 | 11/1993 | Veronesi et al. | 440/53 |
| 5,289,068 | 2/1994 | Veronesi et al. | 310/114 |
| 5,358,200 | 10/1994 | Onda | 244/30 |
| 5,449,129 | 9/1995 | Carlile et al. | 244/52 |
| 5,480,330 | 1/1996 | Brown | 440/38 |
| 5,516,061 | 5/1996 | Glasgow | 244/110 B |
| 5,779,190 | 7/1998 | Rambo et al. | 244/54 |

OTHER PUBLICATIONS

Gearhart et al., Penn State Applied Research Laboratory, *Results of Experimental Investigations With A High Speed, Boundary Layer Intake Pump Jet*, Jan. 1964.

Kerwin et al., The Society of Naval Architects and Marine Engineers, *A Coupled Viscous/Potential Flow Design Method for Wake–Adapted, Multi–Stage, Ducted Propulsors Using Generalized Geometry*, Nov. 1994.

Handwritten note dated Dec. 18, 1986 (one sheet).

*Primary Examiner*—Charles T. Jordan
*Assistant Examiner*—Denise J Buckley
*Attorney, Agent, or Firm*—BakerBotts, LLP

[57] ABSTRACT

A method and arrangement for propelling fluidborne vehicles is disclosed that results in reduction in the overall form drag of certain classes of vehicles. The method and arrangement consists of using a propulsion system with an inlet that circumscribes the transition region between a forebody section containing the widest part of the vehicle and a tapered afterbody section of the vehicle to remove fluid from the viscous boundary layer that is generated by the forward portion of the vehicle, and accelerates this boundary layer fluid through a propulsion system in the afterbody portion of the vehicle. Removal of boundary layer fluid can reduce momentum losses which occur in the wake created by various classes of vehicles.

35 Claims, 5 Drawing Sheets

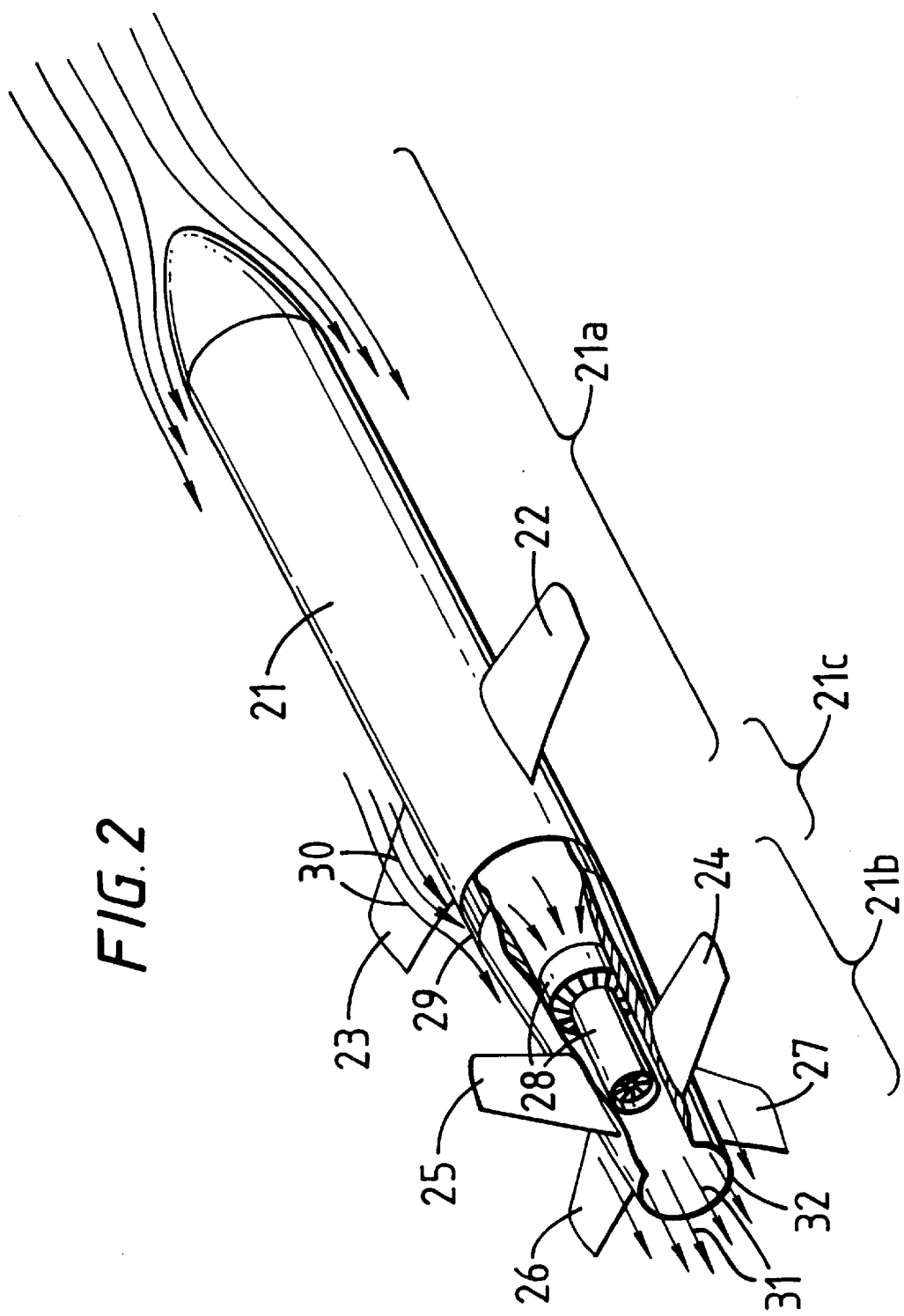

METHOD AND ARRANGEMENT FOR FLUIDBORNE VEHICLE PROPULSION AND DRAG REDUCTION

BACKGROUND OF THE INVENTION

This invention relates to a propulsion system arrangement for a fluidborne vehicle which reduces drag from the viscous boundary layer that is generated by movement of the vehicle through a fluid medium. The viscous boundary layer is inducted into an inlet in the rear portion of the vehicle where the boundary layer fluid is accelerated and then discharged.

Many types of vehicles use propulsion systems which generate thrust on the vehicle by accelerating surrounding fluid. However, most of these propulsion systems are arranged such that fluid from the free-stream surrounding the vehicle approaches the inlet at or near to the speed of the vehicle relative to the far field fluid medium. For most types of gas turbine powered fixed wing aircraft, this is desirable since the high velocity of the fluid approaching the inlet is transformed into pressure head as the fluid is brought to near stagnation at the engine inlet. This reduces the pressure ratio that must be produced by the gas turbine compressor, which translates into a smaller compressor, higher cycle efficiency for the engine and reduced engine weight. The trade-off of course, is increased form, or pressure, drag of the vehicle as a whole, caused by suspending the blunt engine inlet into the free-stream surrounding the vehicle. This almost universal engine arrangement is likely the result of careful trade-off studies performed in concert by aircraft and engine manufacturers to optimize to overall performance of the aircraft; or may simply be a carry-over from reciprocating engine arrangements which do not require large volumes of compressed gas, but are conveniently arranged to drive a propeller rotating in a plane perpendicular to the direction of vehicle motion.

It is also preferable to arrange shaft driven propellers and fans such that the approaching fluid has as near to uniform velocity as possible over the entire inlet area The propeller and fan blade pitch and geometries can be optimized for a narrow range of approach velocities and individual blades will undergo greater cyclic loading, and hence accelerated fatigue and reduced propulsive efficiency, if the fluid velocity upstream of the propeller or fan has a non-uniform angular distribution. This is another possible motivation for the placing of aircraft propellers and fans out away from the boundary layers generated around lifting surfaces, control surfaces and fuselages.

A number of experimental and commercial aircraft have implemented various departures from the forward facing propeller/fan/engine inlet suspended into the freestream. Rotary-wing aircraft for instance, commonly use radially oriented engine inlets, although the main rotor system and tail rotor are almost always located as far away from the main fuselage as practical and as such do not make use of boundary layer flow. So called "pusher-prop" aircraft use propellers or fans at the rear of one or more fuselage or sponson structures, drawing fluid from the boundary layer surrounding the fuselage or sponson to some extent, but the main portion of the fluid acted on by such propellers is generally accepted to be free-stream flow. Any benefit of removing boundary layer flow in these configurations is negated by the propeller wake i.e., "prop wash" which is larger in diameter than the wake from the fuselage or sponson alone and by the fact that the contribution to overall form drag from the fuselage or sponson boundary layer is small when compared with that generated by the large lifting surfaces.

Experimental aircraft such as the X-21A constructed and tested by the National Aeronautics and Space Administration (NASA) Jet Propulsion Laboratory (JPL) have used a sophisticated arrangement of fans, ducts and vent holes distributed over the entire outer surface of the aircraft to almost completely remove all boundary layer fluid. Although the aircraft proved successful from an aerodynamic standpoint, reducing form drag by 20–30%, the complex ducting and exhauster fans left no weight margin for any effective payload and the thousands of small vent holes were impractical from a maintenance standpoint. The holes become almost completely blocked after only a few test flights even in relatively clean runway conditions.

Many other types of fluidborne vehicles use propulsion systems that accelerate fluid surrounding the vehicle but use inlets which face directly forward, drawing fluid only partially from the boundary layer generated by the main body of the vehicle or not at all. Vehicles such as airships have no lifting surfaces and relatively small control surfaces. As such, the form drag of an air ship is due almost entirely to momentum losses in the wake generated by the fluid boundary layer which forms around the main body of the vehicle. Small unmanned aircraft also typically have almost nonexistent lifting surfaces and as such, could benefit in terms of reduced form drag if the conventional forward facing engine inlet cowling were replaced with a more conformal engine inlet designed to remove as much fluid as possible from the boundary layer formed around the aft portion of the aircraft's fuselage.

Seagoing vessels have recently begun using water jets in larger numbers which have inlets that are directed more toward the sides of the hull rather than the conventional propeller drawing fluid from what is typically a complex, swirling mixture of boundary layer fluid moving along the bottom of the hull and fluid from the surrounding freestream. However, conventional water jet propulsion systems currently available for seagoing vessels have small inlets capable of removing boundary layer fluid from only a small portion of the vessel's girth below the waterline. Hence, the majority of the boundary layer flow continues aft only to be released into the turbulent wake behind the ship, where the kinetic energy added to this fluid when it was accelerated nearly to the vessels forward speed is gradually dissipated in swirling eddies.

Small submersible vehicles, both manned and unmanned have been developed which use propulsion means with a large degree of boundary layer ingestion, but are accompanied by after body shapes that taper rapidly causing flow separation during under-thrusted, i.e., under deceleration conditions. This flow separation is tolerable for vehicles which have control surfaces in the free stream or forward of the inlet to the propulsion means which can maintain stable attitude control over the vehicle during under-thrusted conditions. However, the preferred location for such control surfaces is in the aftmost section of the vehicle where the greatest control can be applied with the smallest control surface.

SUMMARY OF THE INVENTION

It is an object of the subject invention to provide a method and arrangement for fluidborne vehicle propulsion which substantially removes boundary layer fluid from around the aft portion of the main body of the vehicle and accelerates this fluid through the propulsion system of the vehicle so as to simultaneously produce thrust and reduce wake, and hence reduce form drag created by the vehicle while avoiding flow separation over the afterbody of the vehicle during under-thrusted conditions.

Another object of the subject invention is to provide an improved vehicle configuration which avoids the potential for flow separation over aft control surfaces while maximizing boundary layer ingestion and minimizing wake losses from the vehicle.

It is a further object of the subject invention to provide a propulsion system arrangement for general directional control e.g., steerage of a fluidborne vehicle and for thrust reversing to provide stopping capability while allowing the propulsion system to remain operating near to its optimum flow/power ratio.

These and other objects of the invention are obtained by providing a propulsion system arrangement for a fluidborne vehicle including a vehicle having a forebody section and an afterbody section which are joined by a transition region. The afterbody section of the vehicle is typically tapered at an angle of no more than 15 degrees to the direction of vehicle motion as measured in a first plane extending parallel to the direction of vehicle motion and intersecting the outer surface of the afterbody section perpendicular to a second plane tangent to the outer surface of the afterbody section. At least a portion of the surface of the vehicle contacts a fluid medium in which the vehicle is supported. An inlet located in the transition region and circumscribing a substantial portion of the surface of the vehicle in contact with the fluid medium receives fluid from the fluid medium. A pump inducts the fluid through the inlet and increases the pressure of the fluid. A discharge nozzle receives the pressurized fluid from the pump and discharges the pressurized fluid from the rear end of the vehicle. In this manner 5% or less of the fluid flowing over the afterbody section separates, i.e., deviates from its flow path along the outer surface of the afterbody section, both when the vehicle is moving and when the vehicle is coasting following termination of pumping. Thus, form drag and vehicle wake are substantially reduced providing improved efficiency. In addition, control surfaces required for stable control of vehicle attitude and direction can be accommodated in a preferred location in the aft section of the vehicle behind the inlet to the propulsion means without incurring loss of control surface effectiveness under decelerating conditions due to flow separation over the afterbody.

BRIEF DESCRIPTION OF THE DRAWINGS

Further objects and advantages of the present invention will be more fully appreciated from a reading of the detailed description when considered with the accompanying drawings wherein:

FIG. 2 is a perspective view of an unmanned aircraft in accordance with the invention.

DETAILED DESCRIPTION OF THE PREFERRED EMBODIMENT

Figure 1:
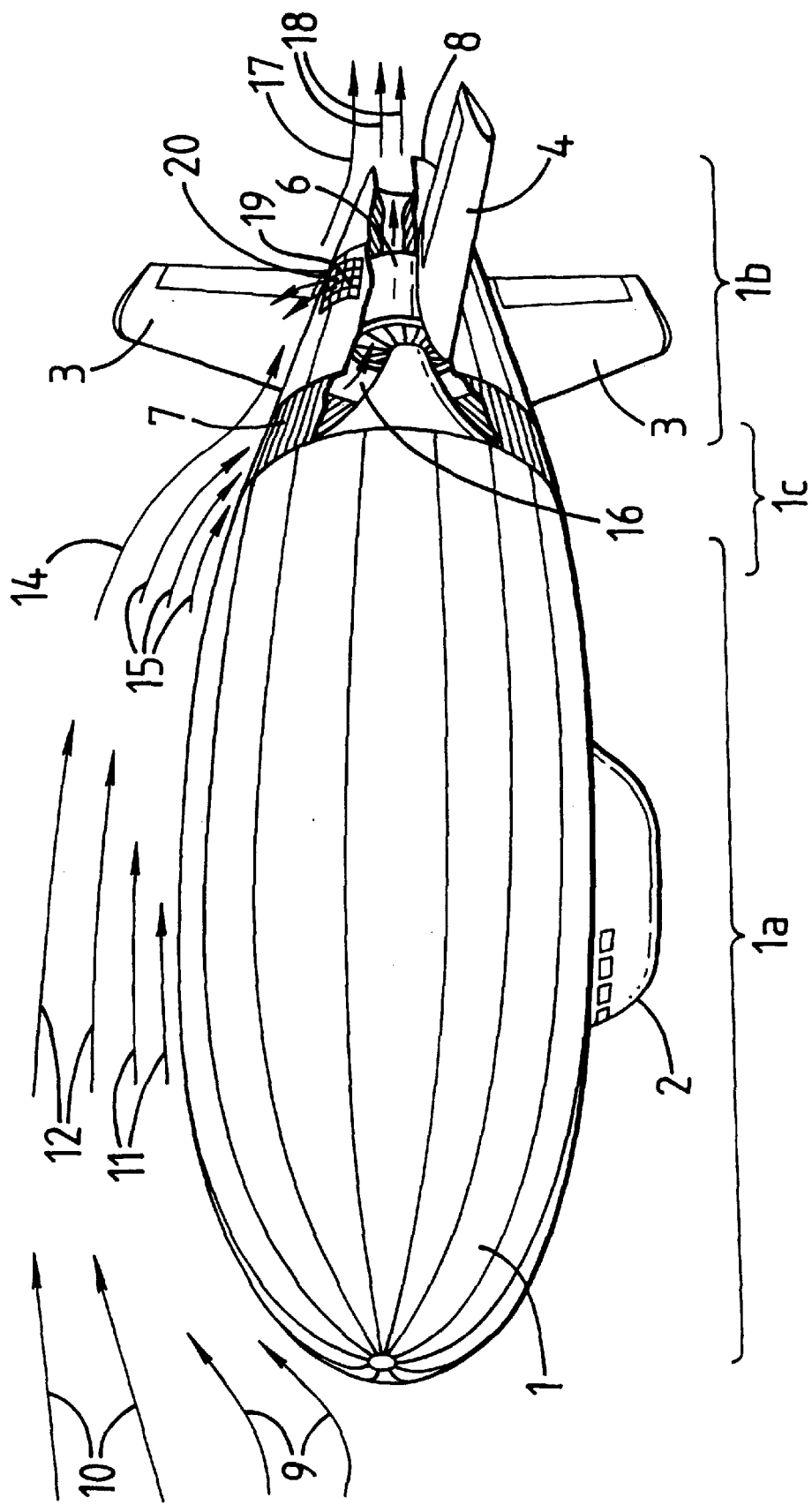
FIG. 1 is a perspective view of an airship arrangement in accordance with the invention.

Referring to FIG. 1, a typical airship in accordance with the invention has a main fuselage structure 1 having a forebody section 1a which includes the largest diameter part of the vehicle, an afterbody section 1b and a transition region 1c joining the forebody and afterbody sections. The airship also includes a cockpit and passenger compartment 2, vertical control surfaces 3 and horizontal stabilizers 4. The airship is held aloft by buoyant forces acting on low density gases g., helium, hydrogen, etc trapped in bags within the main fuselage 1, and as such, requires no lifting surfaces as with heavier-than-air vehicles. Conventional propulsion systems for such airships, typically consist of two or more engine nacelles suspended out from both sides of the cockpit/passenger compartment or the main fuselage. These engines may drive conventional open air propellers or shrouded fans and may be reciprocating engines or gas turbines. Even electric motors powered by a number of sources including batteries and solar cells have been used. The engine inlet typically faces directly forward in the direction of vehicle motion and well away from the cockpit/passenger compartment and the main fuselage to avoid distortion of the inlet velocity profile by the main fuselage boundary layer.

In contrast, in the representative propulsion system arrangement in accordance with the invention, the engine 6 is located within the afterbody section of the fuselage. Preferably the outer surface of the afterbody is tapered inwardly at an angle of no more than 15 degrees from the widest portion of the fuselage main body. Limiting the taper angle of the afterbody in this manner avoids flow separation which can occur under certain propelled conditions, e.g., when the main engine is powered down rapidly while the vehicle is still moving forward at high velocity under its own momentum. Such flow separation over the afterbody can cause loss of control surface effectiveness and loss of vehicle control and stability.

If the vehicle has control surfaces such as the surfaces 3 and 4, the taper angle of the afterbody section should be no more than about 15° in the portion between the transition region 1c and the control surfaces. The use of a tapered afterbody in accordance with the invention is particularly beneficial for vehicles having control surfaces which extend beyond the beam of the ship and into the boundary layer. Even if the vehicle has no control surfaces a gradually tapered afterbody will reduce power consumption and maximize the efficiency of the vehicle.

The inlet 7 for the engine 6 circumscribes the main fuselage at the transition region 1c near the longitudinal location where the outer surface of the fuselage first begins to taper. Air inducted through the inlet 7 by the engine 6 is discharged out through a converging nozzle 8 that accelerates the fluid thereby generating thrust. The nozzle 8 may be pivotable on one or more axes to direct the thrust angularly with respect to the axis of the vehicle and thereby facilitate steering of the vehicle. In addition, the nozzle 8 may include one or more movable flow guides which may be positioned to reverse the thrust from the nozzle to reverse the direction of the vehicle. Alternatively, the nozzle 8 may include a blocking element 69, 70 as shown in FIG. 4(c) to block the flow of fluid and one or more lateral outlet ports 71, 72 may be provided to redirect the fluid laterally or in the forward direction for reverse thrust. The inlet 7 as shown in FIG. 1, incorporates a protective louver to prevent foreign objects e.g., birds, flying debris, etc. above a safe size from being ingested by the engine 6.

Figure 4A:
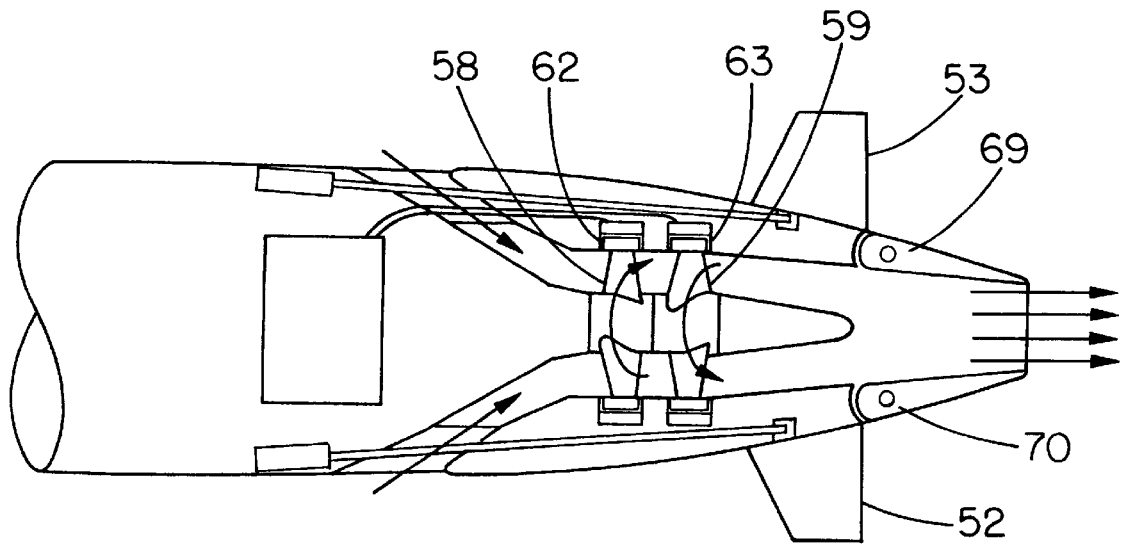
FIGS. 4(a), 4(b) and 4(c) are sectional views of a portion of a vehicle having a propulsion system in accordance with the invention.
Figure 4B:
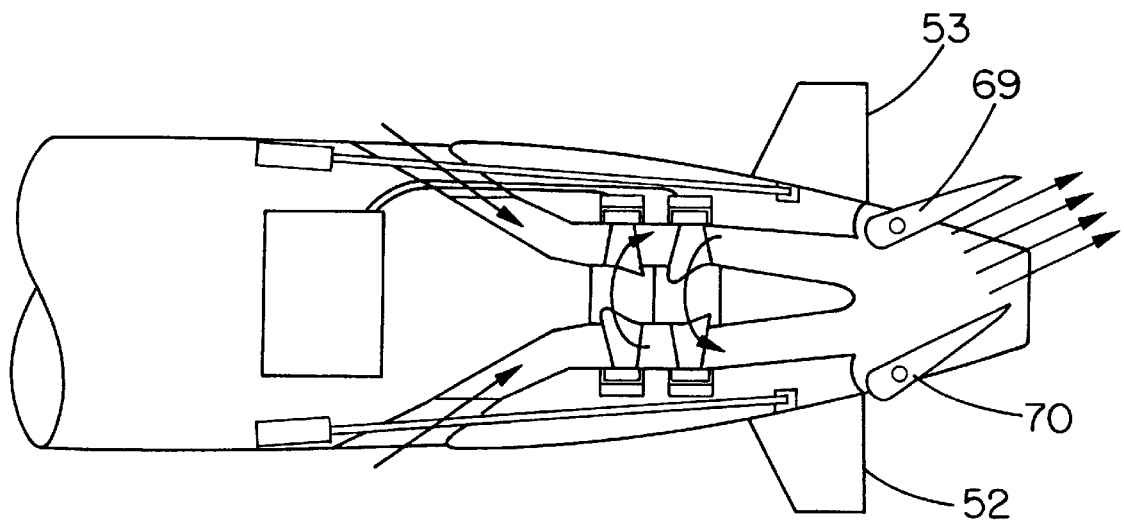
Figure 4C:
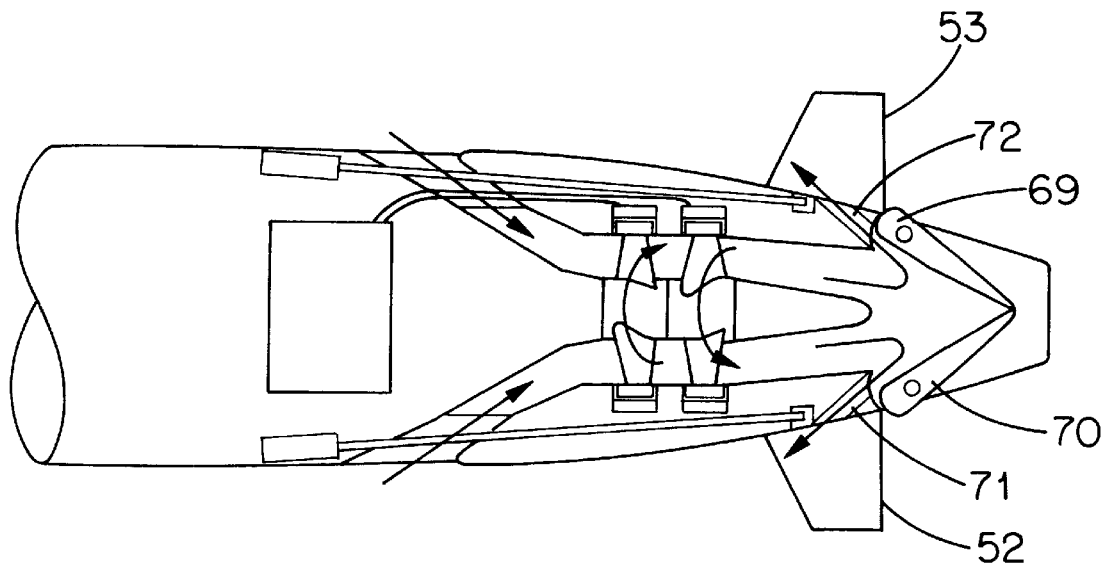

The engine 6 may be a conventional turbofan engine as is often used on commercial airliners, or may be a large fan or series of impellers driven by reciprocating engines or electric motors 62, 63 as shown in FIGS. 4(a)–4(c). The engines which drive the fan or impellers may be located forward or aft of the fan/impellers or around the periphery of the fan/impellers and may be partially or totally integrated with the hub or rim that structurally connect the blades of the fan/impellers together. The fan/impellers may have stationary inlet guide vanes and/or discharge guide vanes which may provide structural support for the fan/impellers shaft and bearings. These guide vanes and/or the blades of the fan/impeller may also incorporate variable pitch mechanisms common to many aircraft turbofan engines. The added weight of the engine at the aft portion of the fuselage may be compensated for by moving the cockpit/passenger compartment 2 farther forward or moving internal solid ballast within the main fuselage 1 farther forward. Additionally, the volume bounded by the outer surface of the afterbody and the inner surface of the flowpath passing through the afterbody provides space for additional gas ballast which can also support some of the vehicle afterbody and engine weight. Optionally, the vehicle may include any number of appendages aside from the cockpit/passenger compartment 2 or the control surfaces 3, 4 which project out into the fluid surrounding the vehicle to provide space for vehicle components which are more readily accommodated outside the bounds of the forebody and afterbody sections of the vehicle.

The aerodynamic benefits of the propulsion system shown in FIG. 1 are threefold. First, the boundary layer 11 formed around the main body of the vehicle, which for an airship and many other similar fluidborne vehicle configurations constitutes most of the viscous boundary layer formed around the vehicle, is substantially reduced by placing the engine inlet 7 in the transition region of the vehicle. The inlet 7 draws in a substantial portion of the boundary layer fluid 15 just before it would normally begin to shed off from the tapering aft section into the wake behind the vehicle where the energy expended by accelerating the fluid to near the vehicle's forward speed through the fluid medium would normally be unproductively dissipated. The boundary layer 11 forms when near stagnant fluid 9 ahead of the vehicle is displaced as the vehicle approaches and due to viscous shear stress, becomes drawn along with the surface of the vehicle. Fluid 12 farther away from the path of the vehicle 10 is less affected. Farther downstream, the fluid 11 near the surface of the vehicle becomes further entrained in the growing viscous boundary layer, while the fluid farther away from the surface 12 remains relatively unaffected.

As the fluid entrained by the boundary layer approaches the inlet 7, the fluid 15 is drawn into the intake and the fluid 14 from the distal free-stream fills in behind the inlet 7, leaving only a relatively thin boundary layer. The fluid drawn in through the inlet 7 continues on through the propulsion system as shown at 16. The thin remaining boundary layer 17 is shed over the propulsion nozzle 8 and mixes with the propulsion system discharge 18 which leaves the vehicle at only a moderately higher velocity. This results in a wake of disturbed air behind the vehicle having a diameter only slightly larger than the nozzle discharge 8. In contrast, the wake created by the boundary layer shed by a conventionally designed vehicle would be equal to or greater than diameter of the main body of the vehicle at its mid section. The smaller wake corresponds to much less energy being dissipated into the fluid medium surrounding the vehicle.

The second advantage to the propulsion system arrangement shown in FIG. 1 is that the component of fluid velocity at the inlet 7 is small, particularly in the direction of vehicle motion, as compared with a conventional forward facing nacelle mounted propulsion system. Thrust is generated by each type of propulsion system by accelerating fluid from the vehicle's surroundings. The direction in which the fluid is accelerated must be directly opposite from the direction in which thrust is desired. The magnitude of the thrust can be expressed in terms of the inlet velocity, $\underline{Vin}$, the discharge velocity, $\underline{Vout}$, and the mass flow rate of fluid through the propulsion system, m, as follows:

$$\text{Thrust} = m(\underline{Vin} - \underline{Vout})$$

where the underscore for $\underline{Vin}$ and $\underline{Vout}$ indicates that these are vector quantities. Therefore, for a given mass flow rate of fluid, the thrust is proportional to the difference in the vector components of inlet and discharge parallel to the direction in which thrust is generated.

For a conventional propulsion system, the inlet velocity is nearly equal to the free-stream velocity. Therefore, the fluid discharged from the nacelle must be accelerated to speeds substantially greater than the free-stream velocity, resulting in a severely disturbed wake behind the propulsion systems and the associated energy dissipation. In the propulsion system arrangement according to the invention, the fluid entering the inlet 7 has a velocity close to that of the vehicle and as such, need only be accelerated to at or above, i.e., 0 to 60% above, the free-stream velocity of the fluid passing over the vehicle. The required velocity differential between the discharge 18 and the surrounding fluid 17 is much less, resulting in reduced energy dissipation in the jet produced by the propulsion system. The component of fluid velocity at the inlet 7 is further reduced by the large size of the inlet as compared to a conventional system, and by inducting the surrounding fluid in a more radially inward direction rather than directly axially as is unavoidable with the conventional system.

The axial component of the fluid crossing the structural boundary of the vehicle at the inlet 7 will be equal to the magnitude of the fluid particle velocity multiplied by the cosine of the angle that the path of the fluid particle makes with the central axis of the vehicle. Therefore, it is desirable to maximize the inlet area, place it where the boundary layer fluid velocity is as close to the vehicle velocity as possible i.e., as far aft as possible but before the boundary layer begins to thicken substantially along the afterbody, and arrange flow guides and/or structural members in the inlet 7 to promote radially inward flow to the maximum extent possible without causing local flow separation around the flow guides.

A third advantage of the propulsion system shown in FIG. 1 is that it produces thrust that is coaxial with the center of drag of the vehicle and can be made to have no net reaction torque on the vehicle. In conventional propulsion systems, it is desirable to place the nacelles low on the vehicle for accessibility. However, this causes a reaction torque that tends to drive the nose of the vehicle upward due to the difference between the axis along which the drag force on the vehicle acts and the axes along which thrust is applied. This is typically corrected for by setting the horizontal stabilizer at an angle which counteracts this reaction torque. However this increases the wake of disturbed air generated by this control surface, which results in greater losses.

Another problem common to conventional propulsion systems is that it is desirable from a cost standpoint to have the nacelle assemblies, including the engines inside, be identical with the exception of the attachment point. This means that the direction of rotation for each engine will be the same, thereby creating torque on the vehicle tending to make it roll. Counter-rotating engines can be used in each nacelle, but this generally dictates two distinct engine designs, which is generally cost prohibitive and does not reduce rolling torque for single engine operation. The rolling torque can be corrected for by skewing the vertical or horizontal control surfaces at slight differential angles, but again, the wake of disturbed fluid generated behind the control surfaces is increased.

In contrast, the single propulsion unit 6 may have one or more pairs of counter-rotating fan/impellers 58, 59 as shown in FIGS. 4(a)–4(c) or stationary flow straightening guide vanes such that the net reaction torque created by the driving engine(s) is zero, thereby avoiding any skewing of the control surfaces and the associated drag increase and eliminating rotational wakes produced by the propulsion unit discharge.

This configuration of the propulsion unit 6 results in a further improvement in propulsive efficiency of the vehicle since rotational components of fluid velocity in the wake generated by the discharge 18 are substantially reduced by the use of counterrotating fan/impellers or flow straightening stationary guide vanes.

The propulsion system shown in FIG. 1 also permits incorporation of several additional attitude control and maneuvering features. One such feature, that is sometimes incorporated with conventional propulsion systems, is thrust vector control. In conventional systems, this is accomplished by rotating the nacelle, or a portion of its discharge, in the vertical or horizontal plane so that thrust is directed at some angle to the central axis of the vehicle, resulting in a reaction torque that causes the heading of the vehicle to change. The same type of directional control may be obtained by mounting the nozzle 8 so that it can be articulated in the horizontal and/or vertical planes, diverting the fluid being discharged 18 at some angle to the central axis of the vehicle.

Another maneuvering feature that may be incorporated in the propulsion system according to the invention is thrust reversing as shown in FIGS. 4(a)–4(c). This is accomplished by providing a set of doors 69, 70 or other movable feature downstream of the engine but upstream of the discharge that can be shifted so as to block discharge of fluid out of the nozzle 8 and divert this fluid out of openings on the side of the vehicle 19 that cause the discharged fluid to be directed forward. This causes a reversing thrust that can be used for backing the vehicle or for stopping or slowing forward motion of the vehicle.

The propulsion system arrangement shown in FIG. I can also be adapted to winged aircraft, although the hydrodynamic benefits as discussed herein are not as great if the vehicle uses large lifting surfaces to remain fluidborne. However, for small high speed vehicles which typically have small lifting and control surfaces as shown in FIG. 2, this type of propulsion systems arrangement can provide substantially increased range and performance.

The vehicle shown in FIG. 2 includes a main body 21 having a forebody section 21a which includes the largest diameter portion of the vehicle, an afterbody section 21b and a transition region 21c. The vehicle also includes small lifting surfaces 22, 23, vertical and horizontal control surfaces 24, 25, 26, 27 and a propulsion system including a turbofan engine 28 or other axial type fluid moving device. In accordance with the invention, the afterbody section 21b is tapered at an angle of no more than about 15° with respect to the direction of motion and the transition region 21c includes an inlet 29 through which the propulsion system inducts fluid from the boundary layer 30 flowing along the main body 21, and discharges this fluid 31 through a nozzle 32. The advantages described above for the airship shown in FIG. 1 are essentially applicable to this vehicle.

A vehicle according to the invention may also include control surfaces 52, 53 which are moveable as shown in FIGS. 4(a)–4(c).

A typical prior art engine inlet for this type of vehicle is located underneath the vehicle and includes a cowling with a forward facing opening. This type of inlet is suitable if the typical engine used to drive the turbofan is an air-breathing, hydrocarbon-burning gas turbine that requires air coming in the intake to be compressed. The cowling will act to supercharge the inlet thereby reducing the size consumption by the compressor. However, small unmanned aircraft will sometimes use more exotic, one-time use drive means for the turbofan such as lithium metal reacting with water to generate steam that is used to drive a steam turbine which in turn drives the turbofan. This type of drive is not air-breathing so supercharging the inlet serves no purpose and, as such, is well suited for use in vehicles in accordance with the invention.

Figure 3A:
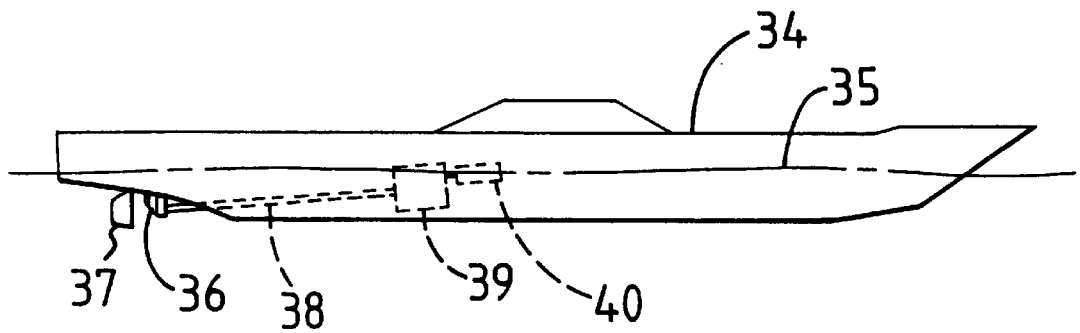
FIGS. 3a, 3b, and 3c are side views of a prior art surface vessel with a propeller propulsion system, a prior art sea going vessel with a nozzle discharge arrangement, and a sea going vessel in accordance with the invention, respectively.

The propulsion system arrangement in accordance with the invention may also be used for propulsion and drag reduction of sea going surface craft. A conventional sea going surface craft shown in FIG. 3a includes a vessel 34 with a waterline 35 and a rudder 37 aft of an open propeller 36. The propeller 36 is driven by a lineshaft 38 which in turn is typically driven by reduction gear 39 and main engine 40. The velocity of the fluid approaching the open propeller 36 is non-uniform due to the boundary layer which forms around the vessel's hull. The fluid velocity near the hull where the upper propeller blades are positioned like hands between 10:00 to 2:00 on a clock face is very low relative to the vessel, while the fluid away from the hull where the lower propeller blades are acting i.e., the 6:00 position, is high relative to the vessel, nearly equal to the free-stream velocity of the hull. Because rotating blade rows can be designed to operate efficiently for one given velocity approaching fluid, the blades in an open propeller arrangement are typically only operating near optimum conditions as they rotate through the 3:00 and 9:00 positions. Through the remainder of their rotation, the blades operate in an "off-design" condition which can result in a loss of efficiency of up to 50% at some angular positions. Open propellers also can typically only ingest a small portion of the boundary layer created by the hull upstream of the propeller. This results in substantial residual form drag due to the viscous wake left by the vessel that could be avoided if better boundary layer management is used.

Figure 3B:
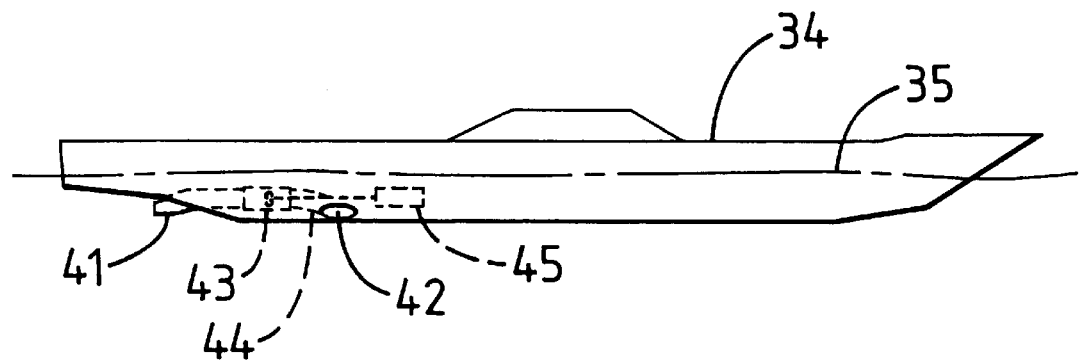

The waterjet configuration shown in FIG. 3b is also a commonly used surface craft propulsion arrangement which provides thrust by ejecting a jet of fluid from the nozzle 41. The fluid is inducted through an inlet opening 42 by a pump unit 43 and is then discharged through the nozzle 41. The inlet velocity profile entering to the rotating blade row within the pump unit 43 can be corrected to approach a uniform angular distribution by careful shaping of the inlet opening 42 and a bend 44 in the inlet passage or by introducing stationary inlet guide vanes, which provide for near constant efficiency of the rotating blades at all angular positions. This improvement in efficiency generally compensates for the additional losses introduced by the internal ducting associated with the waterjet configuration that is not present in an open propeller arrangement, resulting in overall propulsion efficiencies which are comparable e.g., 60–65%. However, as with the open propeller configuration, the conventional waterjet configuration inlet opening is confined to a small portion of the boundary layer formed over the entire surface of the vessel's hull below its waterline. This leaves a large portion of the viscous wake created by the vessel's hull below its waterline. Accordingly, a large portion of the viscous wake created by the vessel is not scavenged by the propulsion system which again results in residual form drag on the vessel that could be avoided to a large extent by improved boundary layer management.

Figure 3C:
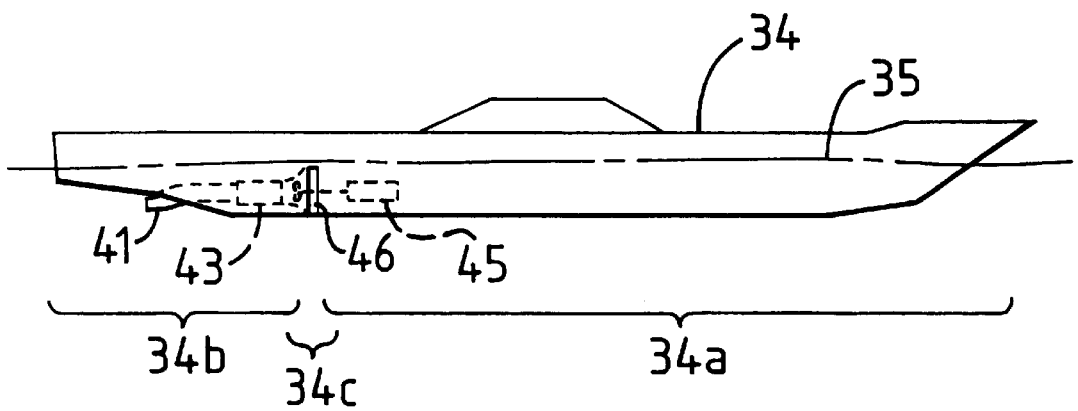

FIG. 3c shows a configuration for a sea going surface vessel in accordance with the invention. As in the airborne vehicles shown in FIGS. 1 and 2, the vessel 34 of FIG. 3c includes a forebody section 34a which includes the largest width portion of the vessel, an afterbody section 34b which is tapered at an angle of no more than about 15° and a transition region 34c joining the forebody and afterbody sections. In accordance with the invention, a fluid inlet opening 46 which encompasses substantially all of the girth of the vessel's hull below the waterline is provided in the transition region 34c. This allows the propulsion inlet to effectively scavenge most of the boundary layer fluid attached to the moving hull. Removing this boundary layer fluid reduces wake formed by the vehicle, and as a result, improves pressure recovery aft of the propulsion system inlet, reducing form drag of the vehicle. This should improve the overall propulsive efficiency of the vessel by up to 5% relative to conventional waterjet inlets in most cases.

Figure 5:
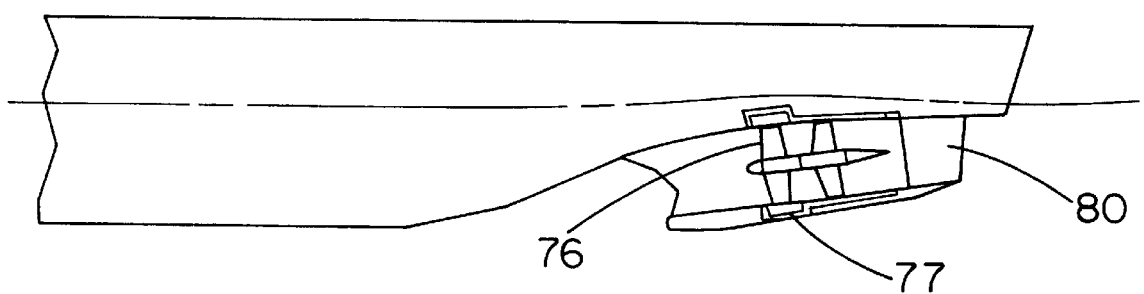
FIG. 5 is sectional view of a sea going surface vessel having a propulsion system in accordance with the invention.

As shown in FIG. 5 the sea going surface vessel may also include a movable flow guide 80 for receiving pressurized fluid from the impeller 76 driven by electric motors 77. The moveable flow guide 80 may be positioned to discharge the fluid in a forward direction relative to the motion of the vehicle so as to applying a reversing thrust force to the vehicle.

Although the invention has been described herein with respect to specific embodiments, many modifications and variations therein will readily occur to those skilled in the art. For example, many other types of fluidborne and even some types of landbound vehicles may benefit from the disclosed propulsion system arrangement. Surface-effect craft may implement a similar propulsion system by arranging the inlets for the turbo-fan engines which provide propulsion and/or air flow to the surface-effect lifting cushion and which are arranged to draw-off the boundary layer at an optimized location on the vehicle over the whole perimeter above the air-cushion. Vehicles immersed in water may include a propulsion arrangement similar to the airship shown in FIG. 1, except the propulsion system may use a fluid moving device that is appropriate for liquids e.g., and axial flow pump with one or more co-rotating or counter-rotating mechanically or electrically driven impellers. Accordingly, all such variations and modifications are included within the intended scope of the invention.

I claim:

1. A propulsion system arrangement for a fluidborne vehicle comprising:

a vehicle including a forebody section, an afterbody section and a transition region joining the forebody and afterbody sections, the forebody section having an outer surface with a shape diverging from the forward most point of the vehicle to and including the widest portion of the vehicle, the afterbody section having an outer surface with a shape converging inwardly in the rearward direction of the vehicle to a shape with cross-sectional area smaller than that at the transition region and having a central outlet nozzle facing rearwardly therefrom, at least a portion of the surface of the vehicle contacting a fluid medium, a single inlet for inducting fluid from the fluid medium, said inlet located solely in the transition region, the inlet circumscribing a substantial portion of the surface of the vehicle in contact with the fluid medium, pumping means in the afterbody section for inducting the fluid through the inlet and increasing the pressure of the fluid, and a discharge means including the central outlet nozzle for receiving the pressurized fluid from the pumping means and discharging the pressurized fluid from the aft end of the vehicle wherein the velocity of the discharged pressurized fluid is greater than the velocity of the fluid inducted into the inlet and fluid flowing over the afterbody section is substantially free of separation both when the vehicle is propelled at constant speed by the pumping means and when the vehicle is coasting following a reduction in pumping by the pumping means.

2. A propulsion system arrangement in accordance with claim 1 wherein the angle formed between the outer surface of the afterbody section and the direction of motion is no more than about 15 degrees as measured in a first plane extending parallel to the direction of forward vehicle motion and intersecting the outer surface of the afterbody section perpendicular to a second plane which is tangent to the outer surface of the afterbody section.

3. A propulsion system arrangement in accordance with claim 1 wherein the vehicle has a central axis parallel to the normal direction of forward motion of the vehicle and the afterbody section includes appendages which form stabilizing surfaces that counteract forces acting on the vehicle which tend to cause an angular displacement of the central axis of the vehicle relative to the direction of motion of the vehicle.

4. A propulsion system arrangement in accordance with claim 3 wherein the appendages include movable portions which when activated provide directional control of the vehicle.

5. A propulsion system arrangement according to claim 3, wherein, in a portion of the afterbody section between transition region and the stabilizing surfaces, the angle formed between the outer surface of the afterbody section and the direction of motion is no more than about 15° as measured in a first plane extending parallel to the direction of vehicle motion and intersecting the outer surface of the afterbody section perpendicular to a second plane which is tangent to the outer surface of the afterbody section.

6. A propulsion system arrangement according to claim 1 wherein the inlet comprises streamlined members which are adapted to conform to the flow path of the fluid inducted from the fluid medium and which connect the surfaces of the forebody section and the afterbody section.

7. A propulsion system arrangement according to claim 6 wherein the streamlined members are spaced apart in a manner such as to limit the size of foreign objects which can be inducted from the surrounding fluid medium into the pumping means.

8. A propulsion system arrangement according to claim 1 wherein the discharge means includes a movable flow guide for receiving and discharging the pressurized fluid in a forward direction relative to the motion of the vehicle so as to apply a reversing thrust force to the vehicle.

9. A propulsion system arrangement according to claim 1 wherein the discharge means includes at least one movable flow guide which can be actuated to redirect the inducted fluid at an angle to the direction of motion of the vehicle so as to provide directional control of the vehicle.

10. A propulsion system arrangement according to claim 1 wherein the fluid pumping means includes at least one pair of counter-rotating axial flow impellers.

11. A propulsion system arrangement according to claim 10 further including an electric motor for driving each of the at least one pair of counter-rotating axial flow impellers.

12. A propulsion system arrangement according to claim 11 wherein each axial flow impeller includes an outer rim, impeller blades mounted onto the outer rim, the outer rim connecting the tips of the impeller blades, a motor stator disposed around the periphery of the outer rim, and an armature integral with the outer rim.

13. A propulsion system arrangement according to claim 1 wherein the discharge means includes a movable nozzle which permits the fluid to be discharged at an angle to the central axis of the vehicle.

14. A propulsion system arrangement according to claim 13 wherein the nozzle includes movable obstruction means which block fluid from being discharged from the nozzle and ports which are opened when the movable obstruction means block the fluid, the ports arranged so as to direct fluid substantially forward in a direction opposite to which fluid is discharged from the nozzle.

15. A propulsion system arrangement according to claim 1 wherein the vehicle is fully immersed in the fluid medium supporting the vehicle and the weight of the fluid medium displaced by the vehicle equals the weight of the vehicle such that the vehicle can be supported in the fluid medium by buoyant forces.

16. A propulsion system arrangement in accordance with claim 1 wherein the vehicle is fully immersed in the fluid medium supporting the vehicle and the weight of the vehicle is greater than the fluid medium displaced by the vehicle, the vehicle further including horizontal lifting surfaces that provide sufficient upward force to support the weight of the vehicle upon motion of the vehicle through the fluid medium.

17. A propulsion system arrangement in accordance with claim 1 wherein the vehicle is partially immersed in the fluid medium supporting the vehicle and the weight of the vehicle is equal to the weight of the fluid displaced by the vehicle such that the vehicle can be supported by buoyant forces.

18. A propulsion system arrangement according to claim 1 wherein the outer surface of the vehicle includes at least one appendage which projects out into the fluid medium to provide space for components of the vehicle which are more readily accommodated outside the bounds of the forebody section and afterbody section of the vehicle.

19. A method for providing vehicle propulsion and reducing vehicle drag comprising:
 providing a vehicle including a forebody section and an afterbody section and a transition region joining the forebody and afterbody sections, the forebody section having a shape diverging from the forward most part of the vehicle to and including the widest portion of the vehicle, the afterbody section having an outer surface with a shape converging inwardly in the rearward direction of the vehicle to a shape with a cross-sectional area smaller than that at the transition region to a central outlet nozzle facing rearwardly therefrom, at least a portion of the surface of the vehicle contacting a fluid medium, a single inlet solely located in the transition region for inducting fluid from the fluid medium, the inlet circumscribing a substantial portion of the surface of the vehicle in contact with the fluid medium, pumping means for inducting the fluid through the inlet and increasing the pressure of the fluid, and a discharge means for receiving the pressurized fluid from the pumping means and discharging the pressurized fluid from the aft end of the vehicle;
 inducting fluid from the fluid medium into the inlet;
 increasing the pressure of the inducted fluid by pumping the inducted fluid through the pumping means; and
 discharging the pressurized inducted fluid through the central outlet nozzle at the aft end of the vehicle wherein the velocity of the discharged pressurized fluid is greater than the velocity of the fluid inducted into the inlet and fluid flowing over the afterbody section is substantially free of separation from the surface of the vehicle between the inlet and the aft end of the vehicle both when the vehicle is propelled at constant speed by the pumping means and when the vehicle is coasting following a decrease of pumping by the pumping means.

20. A method according to claim 19 wherein the angle formed between the outer surface of the afterbody section and the direction of motion of the vehicle is no more than about 15 degrees as measured in a first plane extending parallel to the direction of forward vehicle motion and intersecting the outer surface of the afterbody section perpendicular to a second plane tangent to the outer surface of the afterbody section.

21. A method according to claim 19 wherein the vehicle has a central axis parallel to the normal direction of forward motion of the vehicle and further comprising:
 providing appendages located in the afterbody section, the appendages forming stabilizing surfaces; and
 counteracting any forces acting on the vehicle which cause angular displacement of the central axis of the vehicle relative to the direction of motion of the vehicle with the appendages.

22. A method according to claim 21 wherein the appendages include movable portions and comprising actuating the movable portions to control the direction of motion of the vehicle.

23. A method according to claim 21, wherein, in a portion of the afterbody section between the transition region and the stabilizing surfaces, the angle formed between the outer surface of the afterbody section and the direction of motion is no more than about 15° as measured in a first plane extending parallel to the direction of vehicle motion and intersecting the outer surface of the afterbody section perpendicular to a second plane which is tangent to the outer surface of the afterbody section.

24. A method according to claim 20 comprising:
 providing a discharge means having at least one movable flow guide; and
 actuating the flow guide and redirecting the inducted fluid at an angle to the direction of motion of the vehicle to control the direction of motion of the vehicle.

25. A method according to claim 20 comprising:
 providing a discharge means having at least one movable flow guide; and
 actuating the flow guide and redirecting the inducted fluid in a forward direction relative to the direction of motion of the vehicle to apply a reverse thrust force to the vehicle.

26. A method according to claim 19 wherein the inlet includes streamlined members which are adapted to conform to the flow path of the inducted fluid and which connect the afterbody section to the vehicle.

27. A method according to claim 26 comprising spacing apart the streamlined members so as to limit the size of foreign objects which can be inducted from the surrounding fluid medium into the pumping means.

28. A method according to claim 19 wherein the pumping means includes at least one pair of counter-rotating axial flow impellers.

29. A method according to claim 28 further comprising
providing an electric motor, and
driving each of the at least one pair of counter-rotating axial flow impellers with the electric motor.

30. A method according to claim 29 wherein the electric motor includes an outer rim, motor stator disposed around the periphery of the outer rim, impeller blades mounted onto the outer rim and an armature integral with the outer rim.

31. A method according to claim 19 comprising
providing a discharge means including a movable nozzle, and
discharging the pressured fluid from the nozzle at an angle to the central axis of the vehicle.

32. A method according to claim 31 wherein the nozzle includes a movable obstruction means which blocks fluid from being discharged from the nozzle and ports which are opened when the movable obstruction means blocks the fluid, the ports being arranged so as to direct fluid substantially forward in a direction opposite to which fluid is discharged from the nozzle.

33. A method according to claim 19 further comprising
providing horizontal vehicle lifting surfaces,
immersing the vehicle in the fluid medium, and
lifting the vehicle with the lifting surfaces with sufficient upward force to support the weight of the vehicle upon motion of the vehicle through the fluid medium.

34. A method according to claim 19 comprising
fully immersing the vehicle in the fluid medium wherein the weight of the fluid medium displaced by the vehicle equals the weight of the vehicle, and
supporting the vehicle with buoyant forces.

35. A method according to claim 19 comprising
partially immersing the vehicle in the fluid medium wherein the weight of the fluid medium displaced by the vehicle equals the weight of the vehicle, and
supporting the vehicle with buoyant forces.

* * * * *